United States Patent [19]

Yoon

[11] Patent Number: 5,724,096
[45] Date of Patent: Mar. 3, 1998

[54] VIDEO SIGNAL ENCODING METHOD AND APPARATUS EMPLOYING INTER-BLOCK REDUNDANCIES

[75] Inventor: Sung-Wook Yoon, Seoul, Rep. of Korea

[73] Assignee: Daewoo Electronics Co., Ltd., Seoul, Rep. of Korea

[21] Appl. No.: 774,840

[22] Filed: Dec. 27, 1996

[30] Foreign Application Priority Data

Dec. 29, 1995 [KR] Rep. of Korea ............... 95-64303

[51] Int. Cl.⁶ .................................................. H04N 7/30
[52] U.S. Cl. .................... 348/403; 348/405; 348/420; 382/250
[58] Field of Search ............................ 348/384, 390, 348/400–403, 405, 415, 416, 420, 409–413; 382/232, 236, 238, 248, 250; H04N 7/133

[56] References Cited

U.S. PATENT DOCUMENTS

| | | | |
|---|---|---|---|
| 5,146,324 | 9/1992 | Miller et al. | 348/405 |
| 5,168,375 | 12/1992 | Reisch et al. | 348/403 |
| 5,196,930 | 3/1993 | Kadono et al. | 348/403 |
| 5,272,528 | 12/1993 | Juri et al. | 382/250 |
| 5,311,310 | 5/1994 | Jozawa et al. | 348/416 |
| 5,351,086 | 9/1994 | Park | 348/402 |
| 5,369,439 | 11/1994 | Matsuda et al. | 348/405 |
| 5,475,432 | 12/1995 | Park | 348/409 |
| 5,563,718 | 10/1996 | Wober et al. | 348/403 |

FOREIGN PATENT DOCUMENTS

| | | |
|---|---|---|
| 0 492 537 | 7/1992 | European Pat. Off. . |
| 95/15531 | 6/1995 | WIPO . |

Primary Examiner—Richard Lee
Attorney, Agent, or Firm—Pennie & Edmonds, LLP

[57] ABSTRACT

A frame of a video signal, wherein the frame is divided into non-overlapping blocks of M×N pixels, M and N being positive integers, respectively, is encoded by: arranging the blocks into groups of P×Q blocks, P and Q being positive integers, respectively; transforming each of the P×Q blocks in a group into a set of M×N transform coefficients to thereby provide for the group a first class of transform coefficients corresponding to P×Q sets of M×N transform coefficients, transform coefficients in a set representing different frequency components, respectively; rearranging the first class of transform coefficients to generate M×N sets of P×Q rearranged coefficients, the rearranged coefficients in a set being of an identical frequency component; transforming each set in the M×N sets of P×Q rearranged coefficients into a set of P×Q transform coefficients to thereby provide a second class of transform coefficients corresponding to the transform coefficients of the M×N sets of P×Q rearranged coefficients; and setting the second class of transform coefficients as selected coefficients for the group of P×Q blocks.

20 Claims, 3 Drawing Sheets

FIG. 2

| C(1,1) | C(1,2) | C(1,6) | C(1,7) | C(2,1) | C(2,2) | C(2,6) | C(2,7) |
|---|---|---|---|---|---|---|---|
| C(1,3) | C(1,5) | C(1,8) | C(1,13) | C(2,3) | C(2,5) | C(2,8) | C(2,13) |
| C(1,4) | C(1,9) | C(1,12) | C(1,14) | C(2,4) | C(2,9) | C(2,12) | C(2,14) |
| C(1,10) | C(1,11) | C(1,15) | C(1,16) | C(2,10) | C(2,11) | C(2,15) | C(2,16) |
| C(3,1) | C(3,2) | C(3,6) | C(3,7) | C(4,1) | C(4,2) | C(4,6) | C(4,7) |
| C(3,3) | C(3,5) | C(3,8) | C(3,13) | C(4,3) | C(4,5) | C(4,8) | C(4,13) |
| C(3,4) | C(3,9) | C(3,12) | C(3,14) | C(4,4) | C(4,9) | C(4,12) | C(4,14) |
| C(3,10) | C(3,11) | C(3,15) | C(3,16) | C(4,10) | C(4,11) | C(4,15) | C(4,16) |

| RB1 | | RB2 | | RB3 | | RB4 | |
|---|---|---|---|---|---|---|---|
| C(1,1) | C(2,1) | C(1,2) | C(2,2) | C(1,3) | C(2,3) | C(1,4) | C(2,4) |
| C(3,1) | C(4,1) | C(3,2) | C(4,2) | C(3,3) | C(4,3) | C(3,4) | C(4,4) |

| RB5 | | RB6 | | RB7 | | RB8 | |
|---|---|---|---|---|---|---|---|
| C(1,5) | C(2,5) | C(1,6) | C(2,6) | C(1,7) | C(2,7) | C(1,8) | C(2,8) |
| C(3,5) | C(4,5) | C(3,6) | C(4,6) | C(3,7) | C(4,7) | C(3,8) | C(4,8) |

| RB9 | | RB10 | | RB11 | | RB12 | |
|---|---|---|---|---|---|---|---|
| C(1,9) | C(2,9) | C(1,10) | C(2,10) | C(1,11) | C(2,11) | C(1,12) | C(2,12) |
| C(3,9) | C(4,9) | C(3,10) | C(4,10) | C(3,11) | C(4,11) | C(3,12) | C(4,12) |

| RB13 | | RB14 | | RB15 | | RB16 | |
|---|---|---|---|---|---|---|---|
| C(1,13) | C(2,13) | C(1,14) | C(2,14) | C(1,15) | C(2,15) | C(1,16) | C(2,16) |
| C(3,13) | C(4,13) | C(3,14) | C(4,14) | C(3,15) | C(4,15) | C(3,16) | C(4,16) |

VIDEO SIGNAL ENCODING METHOD AND APPARATUS EMPLOYING INTER-BLOCK REDUNDANCIES

FIELD OF THE INVENTION

The present invention relates to a method and apparatus for encoding a video signal; and, more particularly, to an encoder capable of improving the coding efficiency based on the correlations between blocks of pixels in a video frame.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is necessary to compress or reduce the volume of the transmission data.

The image signal can be normally compressed without seriously affecting its integrity because there usually exist certain correlationships or redundancies among some of the pixels in a single frame and also among those of neighboring frames. Accordingly, most of prior art image signal encoding methods employ various compression techniques built on the idea of utilizing or truncating the redundancies.

One category of such coding methods relates to transform techniques which take advantage of the redundancies existing in a single frame; and includes orthogonal transform methods which convert a block of digital image data into a set of transform coefficients, e.g., a two-dimensional Discrete Cosine Transform(DCT).

Specifically, in the orthogonal transform method such as DCT(discrete cosine transform) or the like, a frame of video signals is divided into equal-sized non-overlapping blocks, for example, blocks of 8×8 pixels, and each of the blocks is transformed from the spatial domain to the frequency domain. As a result, a set of transform coefficients including one DC coefficient and a plurality of(e.g., 63) AC coefficients is obtained for each block. The transform coefficients in a set represent amplitudes of respective frequency components of the pixels in a block, and, in particular, the DC coefficient of the block reflects the average intensity of the pixels in the block, while the AC coefficients represent intensities of the spatial frequency components of the pixels.

The transform coefficients are then quantized based on a predetermined quantization matrix and a quantization scale, wherein the quantization scale may be determined for every macroblock which includes a predetermined number of, e.g., four, blocks, based on, e.g., an activity of an input video signal and an amount of data stored in a transmission buffer. By processing such quantized transform coefficients with a statistical coder employing, e.g., variable length coding (VLC), the amount of data to be transmitted can be effectively compressed.

However, such conventional coding schemes described above merely utilize spatial redundancies within a block, without paying due regard to correlations between blocks in a video frame.

SUMMARY OF THE INVENTION

It is, therefore, an object of the present invention to provide a method and apparatus capable of improving the coding efficiency by taking advantage of spatial redundancies among neighboring blocks in a video frame.

In accordance with the present invention, there is provided a method for encoding a frame of a video signal, wherein the frame is divided into non-overlapping blocks of M×N pixels, M and N being positive integers, respectively, comprising the steps of:

arranging the blocks into groups of P×Q blocks, P and Q being positive integers, respectively; transforming each of the P×Q blocks in a group into a set of M×N transform coefficients, to thereby provide first class of transform coefficients for the group corresponding to P×Q sets of M×N transform coefficients, said transform coefficients in a set representing different frequency components, respectively;

rearranging the first class of transform coefficients to generate M×N sets of P×Q rearranged coefficients, the rearranged coefficients in a set being of an identical frequency component;

transforming each of the set in the M×N sets of P×Q rearranged coefficients into a set of P×Q transform coefficients to thereby provide second class of transform coefficients corresponding to the transform coefficients of the M×N sets of P×Q rearranged coefficients; and setting the second class of transform coefficients as selected coefficients for the group of P×Q blocks.

BRIEF DESCRIPTION OF THE DRAWINGS

The above and other objects and features of the present invention will become apparent from the following description of preferred embodiments given in conjunction with the accompanying drawings, in which:

FIG. 2 illustrates sets of transform coefficients; and

FIG. 3 represents sets of rearranged coefficients.

DETAILED DESCRIPTION OF THE PREFERRED EMBODIMENTS

Figure 1:
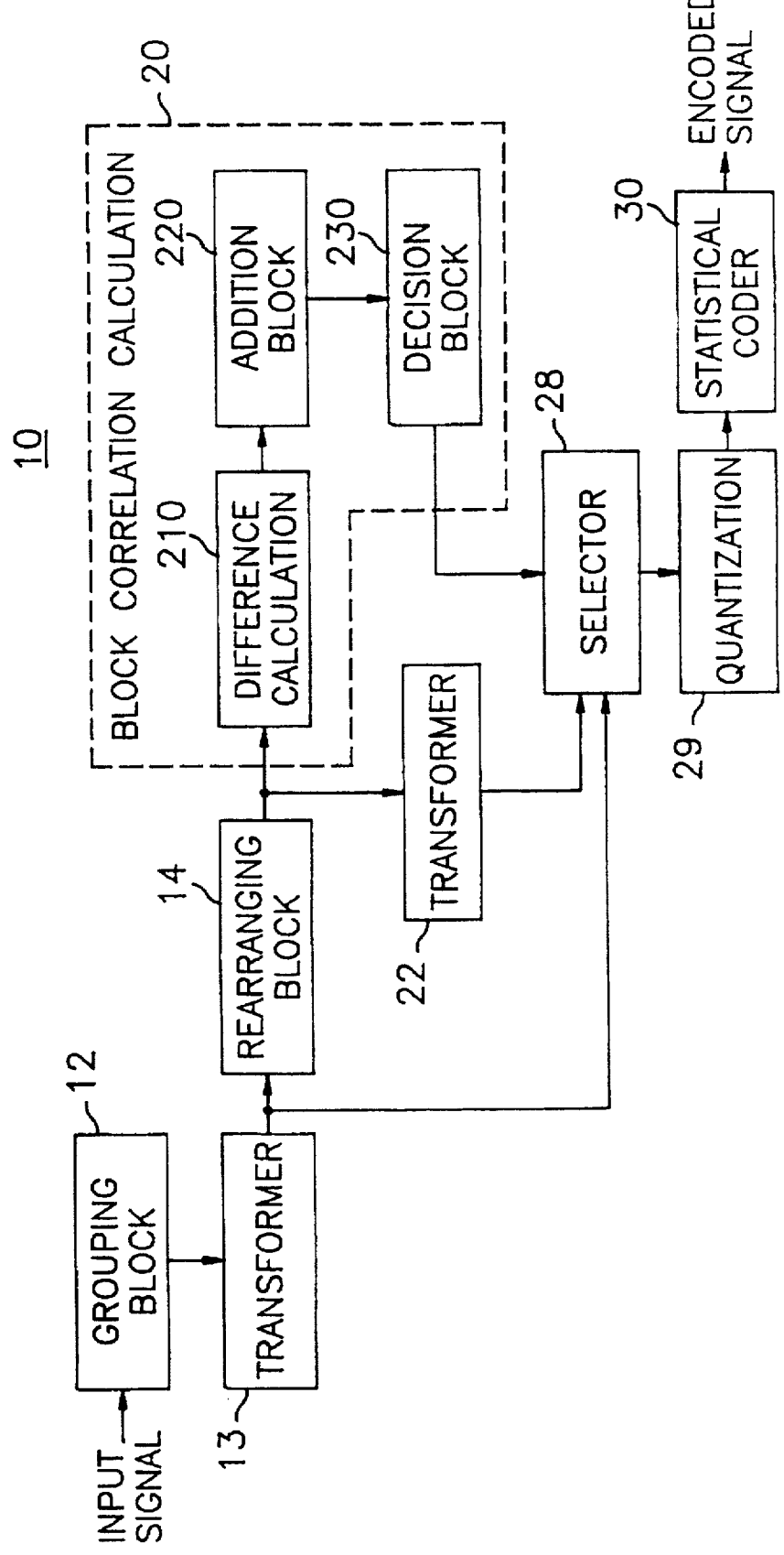
FIG. 1 shows a block diagram of an encoding device in accordance with a preferred embodiment of the present invention.

In FIG. 1, there is illustrated a block diagram of an encoding apparatus 10 in accordance with a preferred embodiment of the present invention, which includes a grouping block 12, a first transformer 13, a rearranging block 14, a block correlation calculation block 20, a second transformer 22, a selector 28, a quantization block 29, and a statistical coder 30.

An input signal of a video frame is fed to the grouping block 12, wherein the video frame is divided into equal-sized non-overlapping blocks of M×N, e.g., 8×8, pixels and 2×2 neighboring blocks constitute a macroblock, M and N being positive integers, respectively. At the grouping block 12, the blocks are arranged into groups of P×Q blocks, P and Q being positive integers, respectively. In a preferred embodiment of the invention, both P and Q are set to 2. That is, 2×2 sets of pixels which correspond to 2×2 blocks included in a macroblock are arranged as a group, each set including M×N pixels.

The first transformer 13, which converts, by using e.g., DCT, pixel data of the input signal from the spatial domain into the frequency domain, generates for each of the P×Q blocks in a group, fed thereto from the grouping block 12, a set of M×N transform coefficients, each transform coefficient representing an amplitude of a frequency component to thereby provide a first class of transform coefficients, which are P×Q sets of M×N transform coefficients.

Referring to FIG. 2, there is illustrated a group of first class of transform coefficients having P×Q, e.g., 2×2, sets of transform coefficients B1 to B4, wherein for the sake of simplicity, both M and N are assumed to be 4; and, therefore, a set of transform coefficients includes 4×4 transform coefficients therein. In FIG. 2, a transform coefficient C(i,j) represents a j-th frequency component in an i-th set of transform coefficients, wherein i=1, 2, ..., I(=P×Q); j=1, 2, ..., J(=M×N); and a frequency component corresponding to a transform coefficient of a greater index j value is higher than that corresponding to a transform coefficient of a smaller index j value. For instance, C(1, 12) represents a transform coefficient corresponding to a 12th frequency component of a first set B1; C(i,1), a DC transform coefficient in an i-th set; C(i,16), an AC transform coefficient of a highest frequency in the i-th set; and each set Bi includes transform coefficients C(i,1) to C(i,16). Each group of transform coefficients is provided to the rearranging block 14 and the selector 28.

At the rearranging block 14, P×Q sets of M×N transform coefficients in a group is rearranged to provide M×N sets of P×Q rearranged coefficients, wherein P×Q rearranged coefficients in a set are of an identical frequency component. Referring to FIG. 3, there are depicted M×N sets of P×Q rearranged coefficients of an identical frequency component taken out from the set of transform coefficients B1 to B4 shown in FIG. 2. That is, a j-th set of rearranged coefficients RBj is composed of transform coefficients C(i,j) having the identical index j. For instance, RB1 includes coefficients C(1,1) to C(4,1); RB10, C(1,10) to C(4,10) and the like. The M×N sets of P×Q rearranged coefficients for each group are provided to the block correlation calculation block 20 and the second transformer 22.

The second transformer 22 transforms M×N sets of P×Q rearranged coefficients for each group in a similar manner as in the first transformer 13 to thereby provide a second class of transform coefficients corresponding to M×N sets of transform coefficients of the P×Q rearranged coefficients. The second class of transform coefficients for the group are coupled to the selector 28.

The block correlation calculation block 20 includes a difference calculation block 210, an addition block 220, and a decision block 230. The block correlation calculation block 20 assesses correlations among P×Q blocks corresponding to a group of transform coefficients, based on the sets of rearranged coefficients for the group provided from the rearranging block 14; and generates a selection signal to the selector 28.

In accordance with the preferred embodiment of the invention, the difference calculation block 210 calculates differences between the rearranged coefficients included in each set of rearranged coefficients; and generates a set of difference values for each set of rearranged coefficients. The difference values may be defined as:

$$E(i,j) = |C(i,j) - C(i-1,j)|$$

or $$E(i,j) = \{C(i,j) - C(i-1,j)\}^2,$$

wherein $E(i,j)$ is an i-th difference value in a j-th set of difference values; $C(i,j)$ and $C(i-1,j)$ are an i-th and an (i−1)st rearranged coefficients in the set of rearranged coefficients RBj, respectively; and $C(0,j)$ is defined as zero.

In another preferred embodiment of the invention, the difference values are determined by considering weight factors thereto, defined as:

$$E(i,j) = w(j) \cdot |C(i,j) - C(i-1,j)|$$

or $$E(i,j) = w(j) \cdot \{C(i,j) - C(i-1,j)\}^2,$$

wherein $E(i,j)$, $C(i,j)$ and $C(i-1, j)$ are identical to those defined above; and $w(j)$ is a weight factor having a smaller value for a greater value of an index j.

The calculated difference values are then coupled to the addition block 220, wherein the difference values of a set are added together to provide a sum of difference values for a set of rearranged coefficients. The sum of difference values in a j-th set may be defined as:

$$S(j) = \sum_{i=1}^{I} E(i,j).$$

The sums of the difference values S(1) to S(I) for a group of rearranged coefficients are then fed to the decision block 230 to be utilized in determining the degree of correlations between the transform coefficients in the group. The decision block 230 assesses the degree of correlations in accordance with a predetermined decision criterion which will be described hereinafter, based on the sums of the difference values coupled thereto from the addition block 220. That is, if it is determined that the degree of correlations is high, the decision block 230 generates a first selection signal; and, otherwise, a second selection signal is generated therefrom.

Referring to the decision criterion for assessing the degree of correlations, the degree of correlations may be defined as:

$$DEG = \frac{1}{J} \cdot \sum_{j=1}^{J} S(j)$$

in accordance with a preferred embodiment of the invention. That is, the degree of correlations is obtained by averaging all the sums S(1) to S(J). In a second preferred embodiment of the invention, the degree of correlations may be determined based on the average of the sums for selected sets of difference values which correspond to lower frequency components. In such an instance, the degree of correlations may be defined as:

$$DEG = \frac{1}{K} \cdot \sum_{j=1}^{K} S(j)$$

with K being smaller than J, the total number of sets of difference values. In the first and the second embodiment, the degree of correlations is considered to be high if DEG is smaller than a predetermined threshold TH0; and the first selection signal is generated by the decision block 230; and, if otherwise, the second selection signal is issued therefrom.

In a third preferred embodiment of the invention, each of the S(j)'s, S(1) to S(J), is compared with a preset threshold TH1. If the number of S(j)'s which are smaller than TH1 is larger than a preset number K2, the degree of correlations is determined as to be high or considerable. Similarly, as in the first and the second embodiments, if the degree of correlations is regarded to be high or considerable, the first selection signal is provided by the decision block 230; and otherwise, the second selection signal is generated therefrom.

The selection signal, generated from the decision block 230, controls the selector 28 to select data between the output provided from the first transformer 13 and the one from the second transformer 22. That is, if the first selection signal is inputted thereto, the second class of transform coefficients from the second transformer 22 is selected; and, if the second selection signal is received, the first class of transform coefficients from the first transformer 13 is selected by the selector 28. The selected data is then fed to the quantization block 29.

The quantization block 29 converts the selected class of transform coefficients in a group into quantized sets of transform coefficients through the use of a conventional quantization method, wherein the quantization of a set of transform coefficients is carried out based on a preset quantization matrix and a preset quantization scale determined for a macroblock. The quantized sets of transform coefficients are, then, fed to the statistical coder 30.

At the statistical coder 30, the quantized sets of transform coefficients from the quantization block 29 are encoded through the use of conventional statistical coding schemes such as RLC(run-length coding) and VLC(variable length coding). The encoded signal is then provided to a transmitter (not shown) for the transmission thereof.

Although only the application of the present invention to the video image signal has been described hereto, it can also be applied to a difference signal representing displacement between frames of data.

In the preferred embodiments of this invention explained hereto, the grouping size is set to P×Q. However, this can be varied by grouping the blocks having an identical quantization scale. For example, if a plurality of macroblocks has a same quantization scale assigned thereto, these macroblocks can be grouped together.

Furthermore, while the present invention has been described with respect to certain preferred embodiments only, other modifications and variations can be made without departing from the spirit and scope of the present invention as set forth in the following claims.

What is claimed is:

1. A method for encoding a frame of a video signal, wherein the frame is divided into non-overlapping blocks of M×N pixels, M and N being positive integers, respectively, comprising the steps of:

(a) arranging the blocks into groups of P×Q blocks, P and Q being positive integers, respectively;

(b) transforming each of the P×Q blocks in a group into a set of M×N transform coefficients, to thereby provide for the group a first class of transform coefficients corresponding to P×Q sets of M×N transform coefficients, the transform coefficients in a set representing different frequency components, respectively;

(c) rearranging the first class of transform coefficients to generate M×N sets of P×Q rearranged coefficients, the rearranged coefficients in a set being of an identical frequency component;

(d) transforming each set of the M×N sets of P×Q rearranged coefficients into a set of P×Q transform coefficients to thereby provide a second class of transform coefficients corresponding to the transform coefficients of the M×N sets of P×Q rearranged coefficients; and (e) setting the second class of transform coefficients as selected coefficients for the group of P×Q blocks.

2. The method according to claim 1, wherein both M and N are 8 and both P and Q are equal to 2.

3. The method according to claim 1, further comprising, after the step (e), the steps of:

(f) calculating difference values between the rearranged coefficients in each set to thereby provide sets of difference values;

(g) determining, based on the sets of difference values, whether the degree of correlations among the blocks in the group is high or low; and (h) if the degree of correlations is determined to be low, updating the selected coefficients with the first class of transform coefficients, thereby resulting in, if the degree of correlations is high, setting the second class of transform coefficients as the selected coefficients and, if otherwise, setting the first class of transform coefficients as the selected coefficients.

4. The method according to claim 3, further comprising, after the updating step (h):

(i) quantizing the selected coefficients to provide coded data; and (j) statistically coding the coded data.

5. The method according to claim 4, wherein said transforming steps (b) and (d) are carried out by using a DCT (discrete cosine transform) method and said statistically coding step (j) is performed using a RLC(run-length coding) and a VLC(variable length coding) techniques.

6. The method according to claim 3, wherein a transform coefficient is expressed as C(i,j) representing the transform coefficient corresponding to a j-th frequency component in an i-th set of transform coefficients and P×Q rearranged C(i,j)'s included in a j-th set have an identical index j, said i being a positive integer ranging from 1 to I(=P×Q), and j being a positive integer ranging from 1 to J(=M×N).

7. The method according to claim 6, wherein said difference values are defined by an equation selected from the group consisting of:

$$E(i,j)=|C(i,j)-C(i-1,j)|,$$

$$E(i,j)=\{C(i,j)-C(i-1,j)\}^2,$$

$$E(i,j)=w(j)\cdot|C(i,j)-C(i-1,j)|,$$

and $$E(i,j)=w(j)\cdot\{C(i,j)-C(i-1,j)\}^2,$$

wherein E(i,j) is an i-th difference value in a j-th set of difference values, w(j) is a weight factor and C(0,j) is set to zero.

8. The method according to claim 7, wherein said weight factor w(j) is equal to or smaller than w(j−1).

9. The method according to claim 8, wherein said determining step (g) includes the steps of:

(g1) providing a sum of difference values included in each set, a sum S(j) for a j-th set of difference values being defined as $$S(j)=\sum_{i=1}^{I}E(i,j);$$

(g2) calculating the degree of correlations DEG defined as $$DEG = \frac{1}{K} \cdot \sum_{j=1}^{K} S(j),$$

K being a positive integer equal to or smaller than J;

(g3) comparing the degree of correlations DEG with a predetermined threshold value TH0; and (g4) if DEG is smaller than TH0, determining the degree of correlations to be high; and deciding the degree of correlations to be low, if otherwise.

10. The method according to claim 8, wherein said determining step (g) includes the steps of:

(g5) providing a sum of difference values included in each set, a sum S(j) for a j-th set of difference values being defined as $$S(j) = \sum_{i=1}^{I} E(i,j);$$

(g6) comparing sums S(1) to S(K) with a preset threshold TH1, K being a positive integer not greater than J(=M× N);

(g7) obtaining the number of sums which are smaller than TH1; and (g8) if the number of sums is greater than a preset number, determining that the degree of correlations is high; and, if otherwise, determining that the degree of correlations is low.

11. A method for encoding a frame of a video signal, wherein the frame is divided into non-overlapping blocks of M×N pixels, M and N being positive integers, respectively, the method comprising the steps of:

(a) arranging the blocks into groups of P×Q blocks, P and Q being positive integers, respectively;

(b) transforming each of the P×Q blocks in a group into a set of M×N transform coefficients, to thereby provide a first class of transform coefficients, which are P×Q sets of M×N transform coefficients C(i,j)'s for the group, a transform coefficient C(i,j) representing a j-th frequency component in an i-th set of transform coefficients and a greater index j representing a higher frequency component than that of a smaller index j with i=1 to I(=P×Q) and j=1 to J(=M×N);

(c) rearranging the first class of transform coefficients to generate M×N sets of P×Q rearranged coefficients, the P×Q rearranged coefficients C(i,j)'s included in a j-th set having an identical index j;

(d) transforming each of the M×N sets of P×Q rearranged coefficients into a set of P×Q transform coefficients to thereby provide a second class of transform coefficients corresponding to the transform coefficients of the M×N sets of P×Q rearranged coefficients; and (e) calculating difference values between the rearranged coefficients in each set of rearranged coefficients obtained in step (c) to provide sets of difference values;

(f) determining, based on the sets of difference values, whether a degree of correlations among the blocks in the group is high or low; and (i) selecting, as transform coefficients for the group of blocks, the second class of transform coefficients provided in step (d) if the degree of correlations is high and the first class of transform coefficients provided in step (b) if otherwise.

12. The method according to claim 11, wherein a difference value is defined by an equation selected in the group consisting of:

$$E(i,j)=|C(i,j)-C(i-1,j)|,$$

$$E(i,j)=\{C(i,j)-C(i-1,j)\}^2,$$

$$E(i,j)=w(j)\cdot|C(i,j)-C(i-1,j)|,$$

and $$E(i,j)=w(j)\cdot\{C(i,j)-C(i-1,j)\}^2,$$

E(i,j) being an i-th difference value in a j-th set of difference values, w(j) being a weight factor and C(0,j) being zero.

13. The method according to claim 11, wherein said determining step (f) includes the steps of:

(f1) providing a sum of difference values included in each set, a sum S(j) for a j-th set of difference values being defined as $$S(j) = \sum_{i=1}^{I} E(i,j);$$

(f2) calculating the degree of correlations DEG defined as $$DEG = \frac{1}{K} \cdot \sum_{j=1}^{K} S(j),$$

K being a positive integer equal to or smaller than J;

(f3) comparing the degree of correlations DEG with a predetermined threshold value TH0; and (f4) if DEG is smaller than TH0, determining the degree of correlations to be high and deciding the degree of correlations to be low if otherwise.

14. The method according to claim 13, wherein said determining step (f) includes:

(f5) providing a sum of difference values included in each set, a sum S(j) for a j-th set of difference values being defined as $$S(j) = \sum_{i=1}^{I} E(i,j);$$

(f6) comparing sums S(1) to S(K) with a preset threshold TH1, K being a positive integer not greater than J(=M× N);

(f7) obtaining the number of sums which are smaller than TH1; and (f8) if the number of sums is greater than a preset number, determining that the degree of correlations is high and, if otherwise, determining that the degree of correlations is low.

15. An apparatus for encoding a frame of a video signal, wherein the frame is divided into non-overlapping blocks of M×N pixels and the apparatus includes means for assigning a preset quantization scale to each block, M and N being positive integers, respectively, the apparatus comprising:

means for arranging P×Q neighboring blocks assigned with an identical quantization scale into a group of blocks, P and Q being positive integers, respectively;

means for transforming each of the P×Q blocks in a group into a set of M×N transform coefficients, to thereby provide for the group a first class of transform coefficients corresponding to P×Q sets of M×N transform coefficients, the transform coefficients in a set representing different frequency components, respectively;

means for rearranging the first class of transform coefficients to generate M×N sets of P×Q rearranged coefficients, the rearranged coefficients in a set being of an identical frequency component;

means for transforming each set of the M×N sets of P×Q rearranged coefficients into a set of P×Q transform coefficients to thereby provide a second class of transform coefficients corresponding to the transform coefficients of the M×N sets of P×Q rearranged coefficients; and means for setting the second class of transform coefficients as selected coefficients for the group of P×Q blocks.

16. The apparatus according to claim 15, further comprising:

means for calculating difference values between the rearranged coefficients in each set to thereby provide sets of difference values;

means for determining, based on the sets of difference values, whether the degree of correlations among the blocks in the group is high or low; and means for, if the degree of correlations is determined to be low, updating the selected coefficients with the first class of transform coefficients, thereby resulting in, if the degree of correlations is high, setting the second class of transform coefficients as the selected coefficients and, if otherwise, setting the first class of transform coefficients as the selected coefficients.

17. The apparatus according to claim 16, wherein a transform coefficient is expressed as C(i,j) representing the transform coefficient corresponding to a j-th frequency component in an i-th set of transform coefficients and P×Q rearranged C(i,j)'s included in a j-th set have an identical index j, said i being a positive integer ranging from 1 to I(=P×Q), and j being a positive integer ranging from 1 to J(=M×N).

18. The apparatus according to claim 17, wherein said difference values are defined by an equation selected from the group consisting of:

$$E(i,j) = |C(i,j) - C(i-1,j)|,$$

$$E(i,j) = \{C(i,j) - C(i-1,j)\}^2,$$

$$E(i,j) = w(j) \cdot |C(i,j) - C(i-1,j)|,$$

and $$E(i,j) = w(j) \cdot \{C(i,j) - C(i-1,j)\}^2,$$

wherein E(i,j) is an i-th difference value in a j-th set of difference values, w(j) is a weight factor and C(0,j) is set to zero.

19. The apparatus according to claim 18, wherein said determining means includes:

means for providing a sum of difference values included in each set, a sum S(j) for a j-th set of difference values being defined as $$S(j) = \sum_{i=1}^{I} E(i,j);$$

means for calculating the degree of correlations DEG defined as $$DEG = \frac{1}{K} \cdot \sum_{j=1}^{K} S(j),$$

K being a positive integer equal to or smaller than J;

means for comparing the degree of correlations DEG with a predetermined threshold value TH0; and means for determining the degree of correlations to be high if DEG is smaller than TH0; and deciding the degree of correlations to below, if otherwise.

20. The apparatus according to claim 18, wherein said determining means includes:

means for providing a sum of difference values included in each set, a sum S(j) for a j-th set of difference values being defined as $$S(j) = \sum_{i=1}^{I} E(i,j);$$

means for comparing sums S(1) to S(K) with a preset threshold TH1, K being a positive integer not greater than J(=M×N);

means for obtaining the number of sums which are smaller than TH1; and means for determining that the degree of correlations is high if the number of sums is greater than a preset number;

and determining that the degree of correlations is low, if otherwise.

* * * * *